(12) United States Patent
Tanaka et al.

(10) Patent No.: US 11,703,776 B2
(45) Date of Patent: Jul. 18, 2023

(54) LIGHT DEFLECTOR, LIGHT SCANNING APPARATUS AND IMAGE FORMING APPARATUS

(71) Applicant: CANON KABUSHIKI KAISHA, Tokyo (JP)

(72) Inventors: Takatoshi Tanaka, Shizuoka (JP); Yoshihiko Tanaka, Shizuoka (JP); Naoki Matsushita, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/517,221

(22) Filed: Nov. 2, 2021

(65) Prior Publication Data

US 2022/0137528 A1 May 5, 2022

(30) Foreign Application Priority Data

Nov. 5, 2020 (JP) .................................. 2020-185008

(51) Int. Cl.
*G03G 15/04* (2006.01)
*G02B 26/12* (2006.01)

(52) U.S. Cl.
CPC ..... *G03G 15/04036* (2013.01); *G02B 26/121* (2013.01); *G03G 15/0409* (2013.01)

(58) Field of Classification Search
CPC ......... G03G 15/04036; G03G 15/0409; G02B 26/121
See application file for complete search history.

(56) References Cited

FOREIGN PATENT DOCUMENTS

| JP | 2000089151 A |   | 3/2000 |
| JP | 2000249959 A | * | 9/2000 |
| JP | 2006154391 A |   | 6/2006 |
| JP | 2006221000 A | * | 8/2006 |
| JP | 2015225200 A |   | 12/2015 |
| JP | 2018155869 A |   | 10/2018 |
| JP | 2018194582 A |   | 12/2018 |
| JP | 2019082599 A |   | 5/2019 |

OTHER PUBLICATIONS

English machine translation of Tanaka (JP 2000-249959 A) (Year: 2000).*
English machine translation of Tanaka (JP 2006221000 A) (Year: 2006).*

* cited by examiner

*Primary Examiner* — Walter L Lindsay, Jr.
*Assistant Examiner* — Geoffrey T Evans
(74) *Attorney, Agent, or Firm* — Canon U.S.A., Inc. I.P. Division (57) ABSTRACT

A light deflector includes a rotary polygon mirror and a motor to rotate the rotary polygon mirror. The rotary polygon mirror includes reflecting surfaces to reflect light emitted from a light source and a hole portion provided in a rotational axis direction. The motor includes a shaft portion in the hole portion and a support member supporting the rotary polygon mirror. The support member is fixed to, and coaxial with, the shaft portion, and includes an insertion portion in the hole portion. The rotary polygon mirror includes a protruded portion near the hole portion and protruding from at least one reflecting surface orthogonal to the rotational axis direction. The protruded portion includes a fitting portion fitted to the shaft portion or the support member and in which a portion continued from a hole portion surface is protruded toward the rotation center more than the surface forming the hole portion.

15 Claims, 8 Drawing Sheets

LIGHT DEFLECTOR, LIGHT SCANNING APPARATUS AND IMAGE FORMING APPARATUS

BACKGROUND OF THE DISCLOSURE

Field of the Disclosure

The present disclosure relates to a light deflector, a light scanning apparatus and an image forming apparatus, and relates to an image forming apparatus such as a copying machine, a printer and a facsimile.

Description of the Related Art

Figure 8:
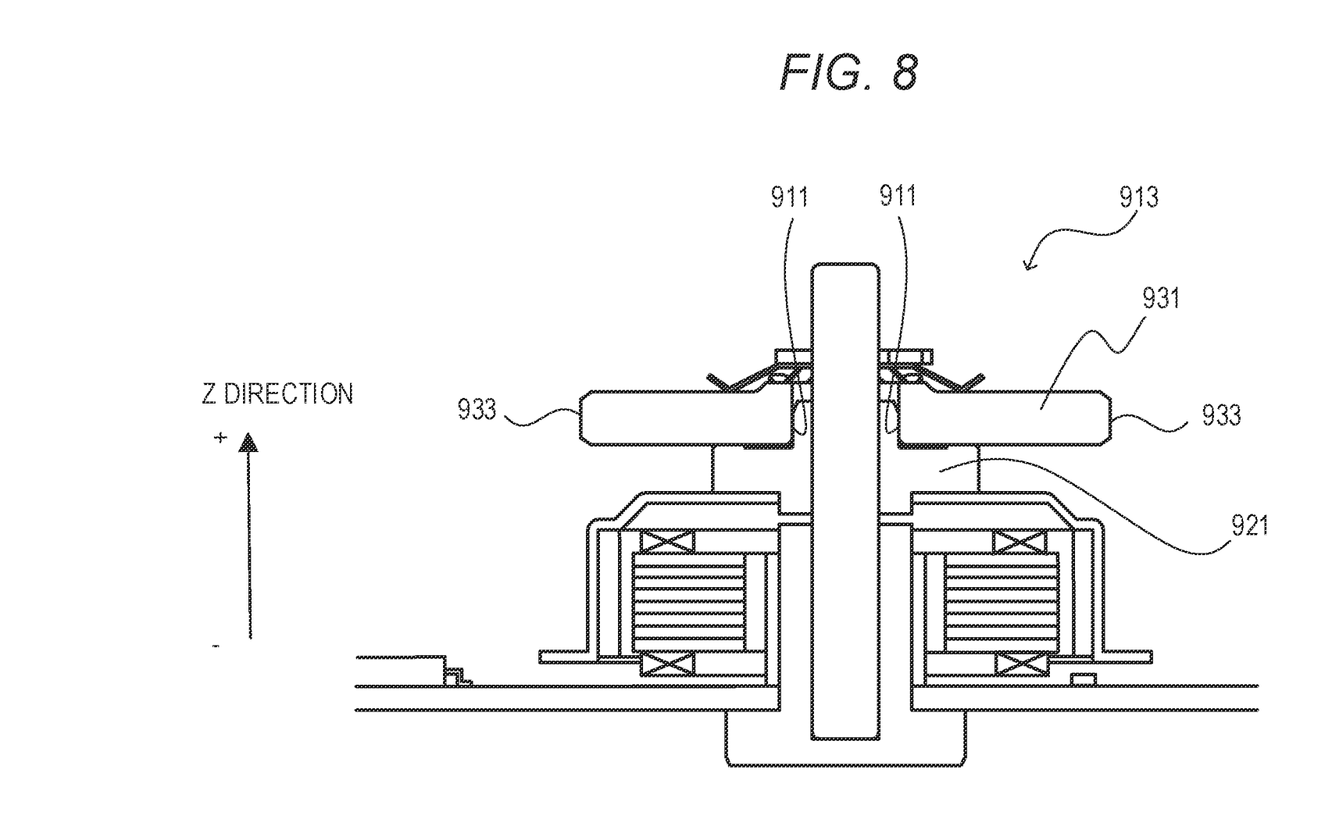
FIG. 8 is a schematic cross-sectional view showing an internal configuration of a conventional light deflector.

A light deflector mounted with a rotary polygon mirror formed by cutting a metal material such as aluminum with high accuracy is used as a light deflector provided in a light scanning apparatus. FIG. 8 is a schematic cross-sectional view showing an internal configuration of a conventional light deflector 913. In the conventional light deflector 913, a rotary polygon mirror 931 having reflecting surfaces 933 is supported by a flange portion 921 which is a support member formed of a metal material, and the flange portion 921 is fitted to the rotary polygon mirror 931 at a fitting portion 911. In order to cut and finish the metallic material such as aluminum serving as a base material of the rotary polygon mirror 931 with high accuracy, a large number of processing steps are required. For this reason, it has recently been tried to form a rotary polygon mirror by resin molding. For example, in Japanese Patent Application Laid-Open No. 2000-089151, a relief groove is provided in a hole portion having the same level as the reflecting surfaces of the polygon mirror by cutting so that deformation caused by shrinkage fitting does not propagate to the reflecting surfaces. In Japanese Patent Application Laid-Open No. 2019-082599, for example, a plurality of protruded portions are provided toward a center of rotation of the rotary polygon mirror, and are pressed onto the flange portion. By having recesses recessed in a rotational axis direction, a static surface deformation of laser reflecting surfaces caused by a press fitting of a rotation shaft is suppressed.

In the former conventional rotary polygon mirror, the hole portion provided with the relief groove has a large diameter. Diameters of holes of the flange portion on both sides of the large diameter hole portion in the rotational axis direction are reduced. It is difficult to form such a structure by resin molding in consideration of a method for taking out the flange portion from a mold. Further, there is a possibility that the static surface deformation of the reflecting surfaces occurs due to an axial misalignment of the both holes of the flange portion when the rotation shaft is press-fitted into the flange portion. In the latter conventional rotary polygon mirror, static deformation of the reflecting surfaces due to press-fitting of the rotation shaft is suppressed by local deformation around the flange portion and the recesses provided in the rotational axis direction of the rotary polygon mirror. However, a wind noise generated when the rotary polygon mirror rotates at high speed may increase.

SUMMARY OF THE DISCLOSURE

The present disclosure has been made under such circumstances and reduces a static surface deformation of reflecting surfaces of a rotary polygon mirror without impairing a quietness of a light deflector.

According to an aspect of the present disclosure, a light deflector includes a rotary polygon mirror including a plurality of reflecting surfaces configured to reflect light emitted from a light source and a hole portion provided in a rotational axis direction at a position to be a center of rotation, and a motor configured to rotate the rotary polygon mirror, wherein the motor includes a shaft portion inserted into the hole portion and a support member configured to support the rotary polygon mirror, wherein the support member is fixed to the shaft portion, is coaxial with the shaft portion, and includes an insertion portion inserted into the hole portion with the shaft portion, wherein the rotary polygon mirror further includes a protruded portion in a vicinity of the hole portion, wherein the protruded portion of the rotary polygon mirror is protruded from at least one surface of the rotary polygon mirror orthogonal to the rotational axis direction, and wherein the protruded portion includes a fitting portion in which a portion continued from a surface forming the hole portion is protruded toward the center of the rotation more than the surface forming the hole portion, and is fitted to the shaft portion or the support member.

Further features of the present disclosure will become apparent from the following description of exemplary embodiments with reference to the attached drawings.

DESCRIPTION OF THE EMBODIMENTS

Hereinafter, an exemplary embodiment of the present disclosure will be described in detail. However, the relative arrangement of the dimensions, materials and shapes of the components described in the embodiment should be appropriately changed according to the configuration and various conditions of the apparatus to which the present disclosure is applied. That is, the scope of the present disclosure is not limited to the following embodiments.

First Embodiment

[Image Forming Apparatus]

Figure 1A:
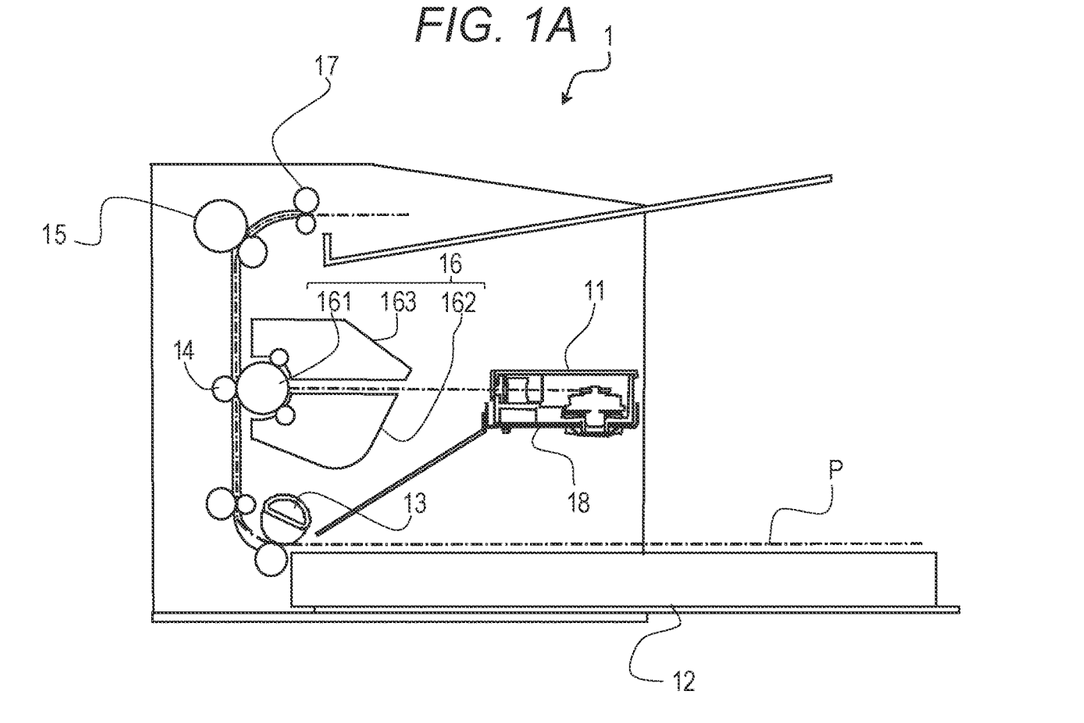
FIG. 1A is a cross-sectional view of an image forming apparatus of a first to third embodiments.

FIG. 1A is a view showing an image forming apparatus 1 which is an electrophotographic laser printer using a light scanning apparatus 11 of a first embodiment. The light scanning apparatus 11 is installed on an optical bench 18. The optical bench 18 is a portion of a casing of the image forming apparatus 1. The image forming apparatus 1 is provided with a feed unit 12 on which a recording medium (hereinafter referred to as a sheet) P such as paper is placed, a feed roller 13, a transfer roller 14 as a transfer unit, and a fixing device 15 as a fixing unit. Further, in the image forming apparatus 1, an image forming portion 16 is disposed at a position opposite to the transfer roller 14 with respect to a conveying path of the sheet P. The image forming portion 16 is a process cartridge detachably attached to a main body of the image forming apparatus 1. The image forming portion 16 includes a photosensitive drum 161 which is an image bearing member, and a developing device 162 configured to develop an electrostatic latent image formed on the photosensitive drum 161 with toner to form a toner image. The image forming portion 16 further includes a container 163 configured to collect toner remaining on the photosensitive drum 161 after transferring the toner image to the sheet P. The sheet P is fed from the feed unit 12 by the feed roller 13. The toner image formed on the photosensitive drum 161 is transferred onto the sheet P by the transfer roller 14. Thereafter, in the fixing device 15, an unfixed toner image on the sheet P is fixed to the sheet P by heat and pressure. The sheet P on which the toner image is fixed is discharged outside the image forming apparatus 1 by a discharge roller 17. The image forming apparatus 1 having the light scanning apparatus 11 is not limited to a monochrome image forming apparatus shown in FIG. 1A, and may be, for example, a color image forming apparatus.

[Light Scanning Apparatus]

Figure 1B:
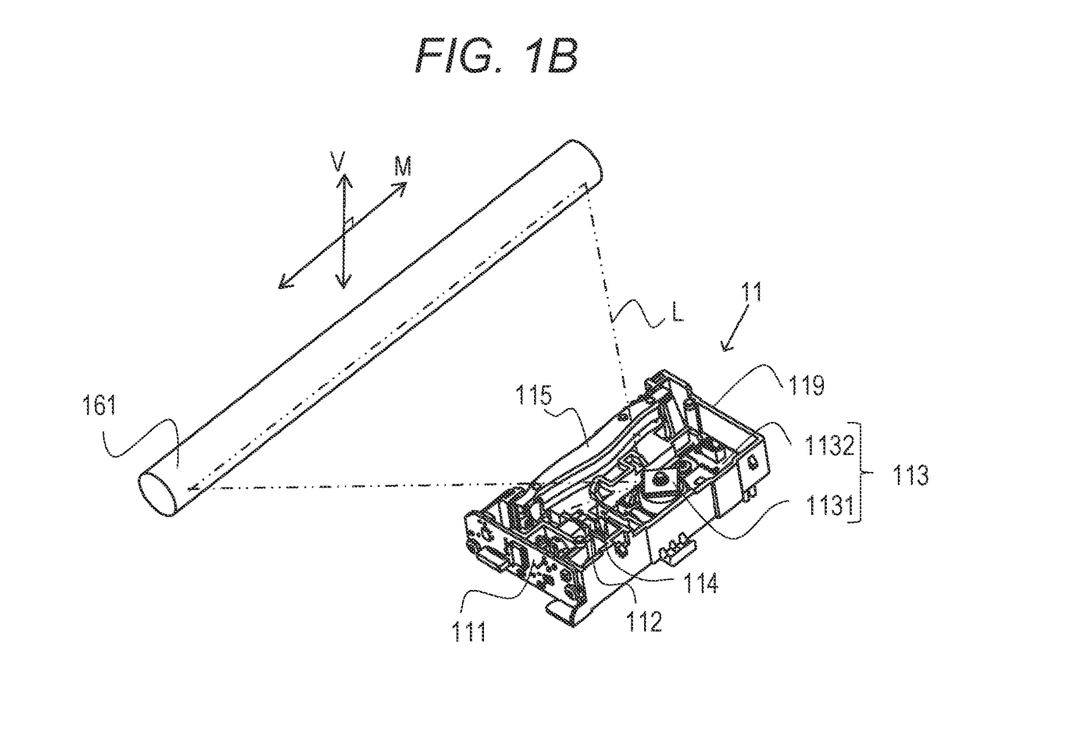
FIG. 1B is a view showing a light scanning apparatus of the first to third embodiments.

FIG. 1B is a perspective view showing the configuration of the light scanning apparatus 11 of the first embodiment. A laser light L (two-dot chain line), which is light emitted from a light source device 111 including a semiconductor laser (not shown), which is a light source, is condensed only in a sub-scanning direction V by a cylindrical lens 112. Here, a direction in which the laser light L emitted from the light source device 111 scans the photosensitive drum 161 is called a main scanning direction M, and a direction substantially orthogonal to the main scanning direction M is called the sub-scanning direction V. The laser light L condensed in the sub-scanning direction V is restricted to a predetermined beam diameter by an optical stop 114 formed in an optical box 119 made of black resin. The laser light L is condensed in a long line shape in the main scanning direction M on a plurality of surfaces (hereinafter referred to as reflecting surfaces) reflecting the laser light L of the rotary polygon mirror 1131 which is a portion of a light deflector 113. The rotary polygon mirror 1131 is driven and rotated by a drive motor 1132 which is a portion of the light deflector 113 to deflect the laser light L incident on the reflection surfaces. After passing through an fθ lens 115, the deflected laser light L is condensed and scanned on the photosensitive drum 161 to form an electrostatic latent image. The rotary polygon mirror 1131 has four reflecting surfaces in FIG. 1B, but may have other number of reflecting surfaces.

[Light Deflector]

Figure 2A:
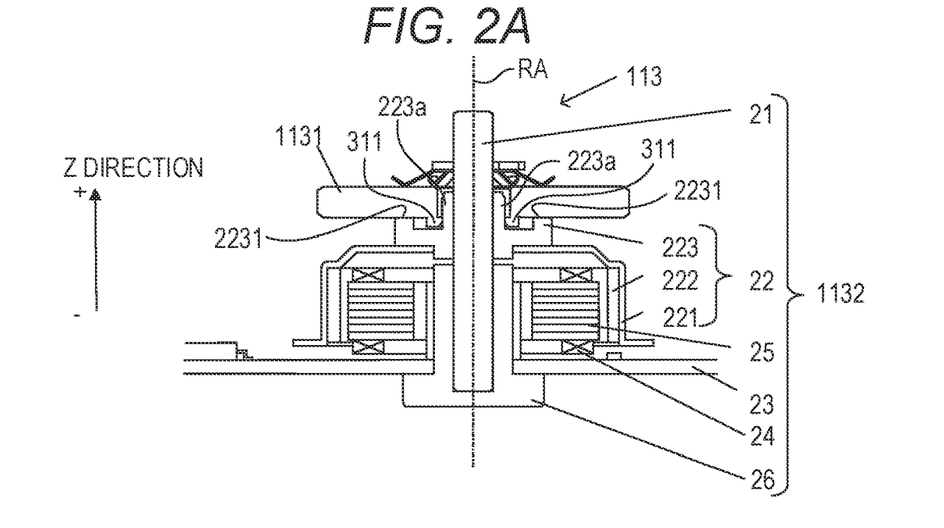
FIG. 2A is a schematic cross-sectional view showing an internal configuration of a light deflector of the first embodiment.

FIG. 2A is a schematic cross-sectional view showing an example of the internal configuration of the light deflector 113 provided in the light scanning apparatus 11 of the first embodiment. A drive motor 1132 configured to rotate the rotary polygon mirror 1131 has a shaft 21 which is a shaft portion supported by a bearing 26. The drive motor 1132 has a rotor 22 provided with a yoke 221 integrally connected to the flange portion 223 by caulking or the like and a rotor magnet 222. The shaft 21 rotates integrally with the rotor 22 and the rotary polygon mirror 1131 in a state in which the shaft 21 is fitted to the bearing 26 by a magnetic force generated by a stator coil 24 and a stator core 25 fixed to a circuit board 23 (board) on which the drive motor 1132 is mounted. Here, a direction substantially parallel to the shaft 21, that is, a rotational axis direction is assumed to be a Z direction. In the Z direction, a side on which the circuit board 23 is installed in the optical box 119 is defined as the − (minus) direction and the opposite side as the + (plus) direction.

Figure 2B:
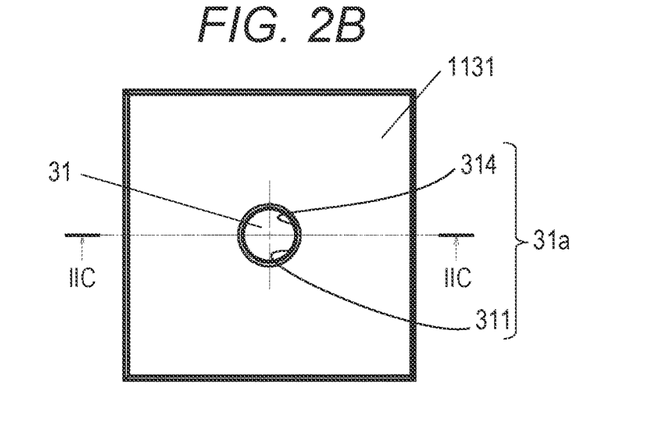
FIG. 2B is a schematic view showing a structure of a rotary polygon mirror.
Figure 2C:
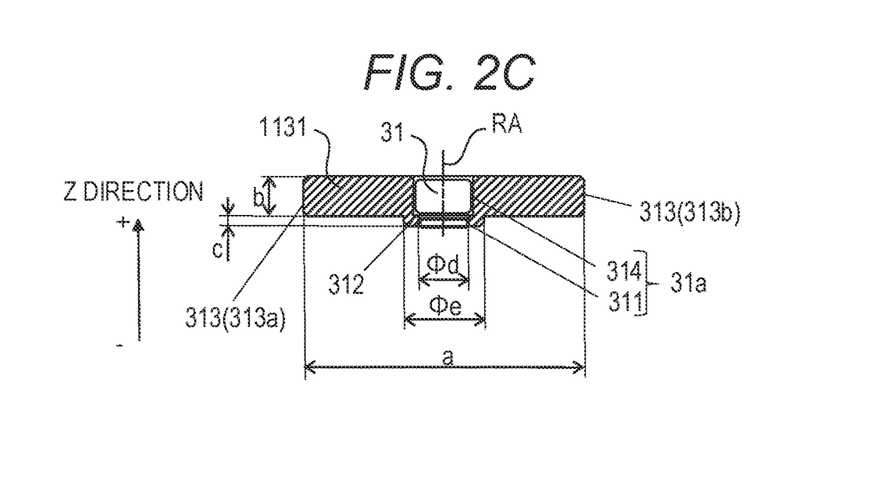
FIG. 2C is a cross-sectional view of the rotary polygon mirror taken along a line IIC-IIC in FIG. 2B.

A shape of the rotary polygon mirror 1131 will be described. FIG. 2B and FIG. 2C are views showing the shape of the rotary polygon mirror 1131 of the first embodiment. FIG. 2B is a view of the rotary polygon mirror 1131 viewed from the + side in the Z direction, in other words, from above. FIG. 2C is a cross-sectional view of the rotary polygon mirror 1131 taken along a line IIC-IIC in FIG. 2B. The rotary polygon mirror 1131 is provided with a hole 31 which is a hole portion formed by an inner surface 31a surrounding the flange portion 223 when the rotary polygon mirror 1131 is attached to the flange portion 223 (support member) of the light deflector 113. The hole 31 is provided in the rotary polygon mirror 1131 so as to pass through in the rotational axis direction at a position as the center of rotation of the rotary polygon mirror 1131. The shaft 21 and a portion of the flange portion 223 (an insertion portion 223a to be described later) are inserted into the hole 31. The inner surface 31a has, for example, a fitting portion 311 as shown in FIG. 2A in a lower portion in the Z direction of the inner surface 31a. The fitting portion 311 is fitted to the flange portion 223. Here, in the Z direction, a portion of the inner surface 31a excluding the fitting portion 311 is referred to as an other portion 314.

The fitting portion 311 has a smaller hole diameter than the other portion 314 of the inner surface 31a. In other words, the fitting portion 311 is protruded more toward the center of the hole 31 than the other portion 314. An outer periphery of the hole 31 on a lower surface of the two surfaces perpendicular to the rotational axis direction (Z direction) of the rotary polygon mirror 1131 is provided with a protrusion 312 which is a protruded portion extending in the rotational axis direction and protruding toward the flange portion 223, for example, in the Z direction. As described above, in the first embodiment, in the vicinity of the hole 31, the protrusion 312 is protruded from at least one surface orthogonal to the rotational axis direction of the rotary polygon mirror 1131. The fitting portion 311 is provided on an inner surface forming the protrusion 312 of the inner surface 31a. A portion continued from the other portion 314 of the hole 31 in the protrusion 312 serves as the fitting portion 311. The fitting portion 311 is protruded toward the center of rotation more than the other portion 314 of the inner surface 31a forming the hole 31, and is fitted to the flange portion 223. The flange portion 223 as a support member is fixed to the shaft 21.

The flange portion 223 has an insertion portion 223a inserted into the hole 31 together with the shaft 21, and a support portion 2231 configured to support the rotary polygon mirror 1131. The flange portion 223 is coaxial with the shaft 21. The support portion 2231 abuts on a surface on a side (board side) of the circuit board 23 out of two surfaces orthogonal to the rotational axis RA of the rotary polygon mirror 1131 to support the rotary polygon mirror 1131. A space is formed between the protrusion 312 and the flange portion 223.

A hole diameter of the other portion 314 of the hole 31 needs to be set larger than the hole diameter of the fitting portion 311. In order to prevent the fitting portion 311 from falling into a press-fitted state when the rotary polygon mirror 1131 is deformed due to a temperature change or the like, the hole diameter of the other portion 314 is preferably set to be at least several 10 μm larger than the hole diameter of the fitting portion 311. Here, a length (diameter) of the rotary polygon mirror 1131 in a direction substantially orthogonal to the Z direction, that is, a length from one reflecting surface 313a to the other reflecting surface 313b is defined as a dimension "a". The reflecting surfaces 313a and 313b are collectively referred to as the reflecting surfaces 313. A length (hole diameter, inner diameter) of an inner periphery of the protrusion 312 in the direction substantially orthogonal to the Z direction is defined as a diameter Φd. A length (outer diameter) of an outer periphery of the protrusion 312 in the direction substantially orthogonal to the Z direction is defined as a diameter Φe. A length (thickness) of the rotary polygon mirror 1131 in the Z direction is defined as a dimension "b". An extension amount (protrusion amount) of the protrusion 312 from the surface (concretely, the lower surface) of the rotary polygon mirror 1131 in the Z direction is defined as a dimension "c".

[Molding by Mold]

Figure 3A:
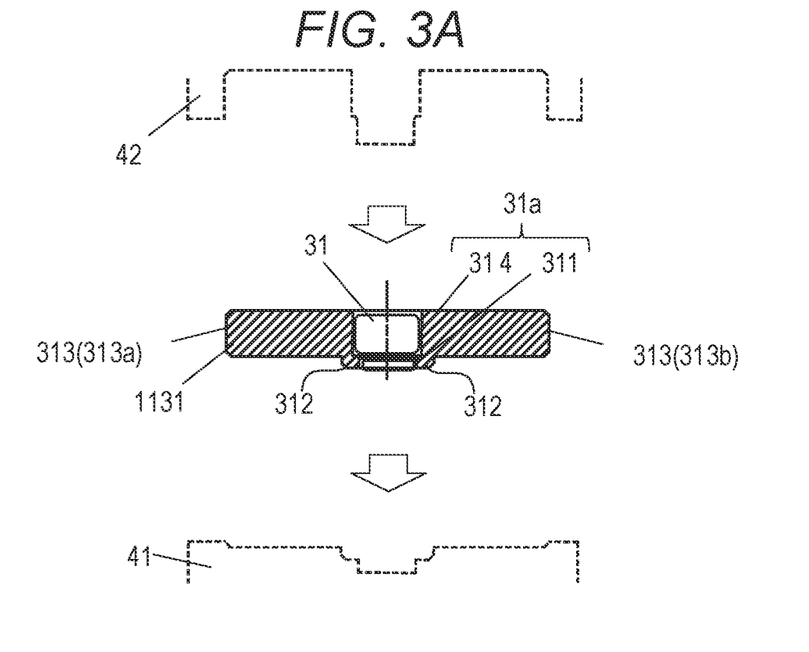
FIG. 3A is a conceptual view showing a method for removing a mold when molding the rotary polygon mirror of the first embodiment.

Hereinafter, a case where the rotary polygon mirror 1131 is molded by injection molding will be described. FIG. 3A is a view showing molds and the rotary polygon mirror 1131 when the rotary polygon mirror 1131 is molded by injection molding. In FIG. 3A, the molds are shown in dashed lines. The molds comprise a movable side 41 and a fixed side 42. As shown by the arrows in FIG. 3A, after the rotary polygon mirror 1131 is formed and after the movable side 41 is moved, the rotary polygon mirror 1131 is removed from the fixed side 42. In order to take out the rotary polygon mirror 1131 from the molds (the movable side 41 and the fixed side 42), the hole diameter of the other portion 314 of the hole 31 must be set larger than the hole diameter (the inner diameter) of the fitting portion 311.

The protrusion 312 has a cylindrical shape coaxial with the hole 31. By forming the protrusion 312 into the cylindrical shape, it is possible to suppress the generation of wind noise when the rotary polygon mirror 1131 is rotated. The dimension "c", which is the extension amount of the protrusion 312 from the lower surface of the rotary polygon mirror 1131, is preferably shorter than the dimension "b" (c<b). The dimension "c" is preferably 50% or less of the dimension "b". If the dimension "c" is too large, the surface accuracy of the reflecting surfaces 313 may be deteriorated. The resin material used in the rotary polygon mirror 1131 is preferably a material excellent in precision moldability. For example, a polycarbonate resin or an acrylic resin is suitable, but other resins (e.g., cycloolefin polymers) or composite resins may be used. The rotary polygon mirror 1131 is manufactured in such a manner in which after a resin molded product is molded by the injection molding, aluminum which is a metal material is formed into films on the reflecting surfaces 313 of the resin molded product by vacuum evaporation or sputtering.

[Positioning and Fixation]

Figure 4:
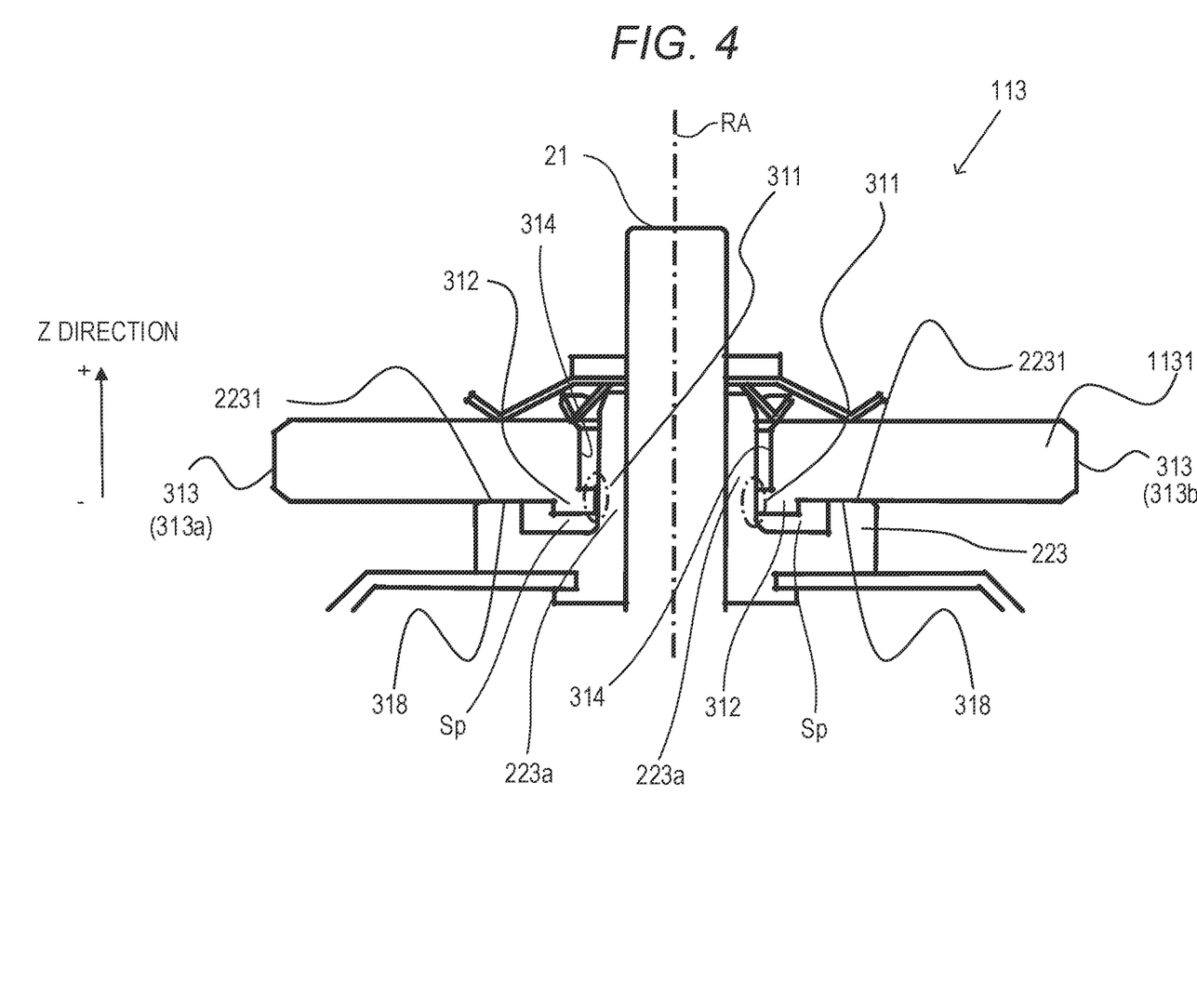
FIG. 4 is a schematic cross-sectional view showing a method of securing and positioning the rotary polygon mirror to the light deflector of the first embodiment.

Referring to FIG. 4, a method of positioning the flange portion 223 for positioning the rotation center of the rotary polygon mirror 1131 and supporting the rotary polygon mirror 1131 in the rotational axis direction will be described. In FIG. 4, the protrusion 312 is provided on the surface of the circuit board 23 side of the two surfaces of the rotary polygon mirror 1131 orthogonal to the rotational axis RA. In the first embodiment, the hole 31 of the rotary polygon mirror 1131 is fitted onto the flange portion 223 from the + side in the Z direction, and the fitting portion 311 of the rotary polygon mirror 1131 is fitted onto the flange portion 223. The fitting portion 311 is fitted to the insertion portion 223a of the flange portion 223. The flange portion 223 is made of metal capable of cutting with high accuracy, such as brass, aluminum, stainless steel, and the like. The fitting portion 311 is set to be a clearance fit of several ten microns or less. The flange portion 223 has the support portion 2231 in contact with the lower surface of the rotary polygon mirror 1131. The support portion 2231 of the flange portion 223 contacts a seat surface 318 of the lower surface of the rotary polygon mirror 1131, thereby positioning the rotary polygon mirror 1131 in the Z direction.

The materials constituting the rotary polygon mirror 1131 and the flange portion 223 have different linear expansion coefficients because the rotary polygon mirror 1131 is made of resin and the flange portion 223 is made of metal. Therefore, when the temperature of the rotary polygon mirror 1131 decreases, there is no gap between the fitting portion 311 and the flange portion 223, and stress is radially generated in the rotary polygon mirror 1131. The stress causes static surface deformation of the reflecting surfaces 313. For example, when static surface deformation occurs in the conventional light deflector 913 shown in FIG. 8, the reflecting surfaces 933 are greatly deformed by the stress generated in the fitting portion 911 because the reflecting surface 933 and the fitting portion 911 are located at the same position in the Z direction or are included in the same range in level. Therefore, if the deformation amount is different among the reflecting surfaces 933 of the rotary polygon mirror 931, a scanning speed in the main scanning direction becomes uneven so that image deterioration occurs.

In the light deflector 113 of the first embodiment shown in FIG. 4, the fitting portion 311 is disposed at a position shifted to the − (minus) side in the Z direction with respect to the reflecting surfaces 313. Further, since the fitting portion 311 is formed in the shape of the protrusion 312, the static surface deformation of the reflecting surfaces 313 is reduced, and image deterioration is suppressed. A space Sp is formed between the protrusion 312 and the flange portion 223 in the Z direction. When the radial stress is generated in the fitting portion 311, the protrusion 312 is largely deformed. If the protrusion 312 and the flange portion 223 are in contact with each other, there is a risk that the rotary polygon mirror 1131 may tilt due to the deformation of the protrusion 312. Therefore, in the first embodiment, the space Sp is provided between the protrusion 312 and the flange portion 223.

[Comparison with the Related Art]

Figure 3B:
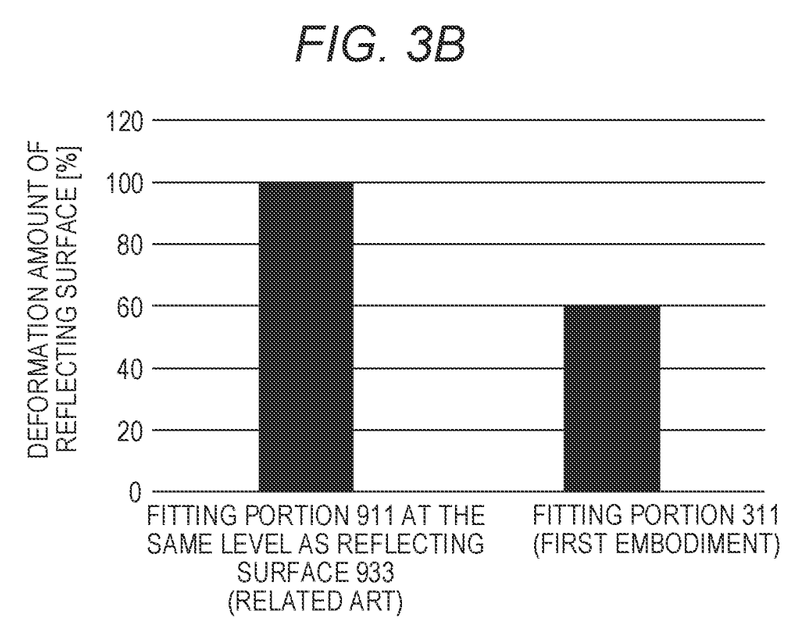
FIG. 3B is a view showing a simulation result of a suppression effect of static surface deformation of reflecting surfaces.

FIG. 3B is a view showing a comparison result of the deformation suppression of the reflecting surfaces between the first embodiment and the related art calculated by a numerical simulation. In FIG. 3B, a case for the fitting portion 911 having the same level as the reflecting surfaces 933 of the related art of FIG. 8 is provided on the left side, and a case for the fitting portion 311 of the first embodiment of FIG. 4 is provided on the right side. In FIG. 3B, the vertical axis indicates the deformation amount [%] of the reflecting surface. The result is a calculation result when the shape of the rotary polygon mirror 1131 shown in FIGS. 2B and 2C is the dimension "a"=14 mm, the dimension "b"=2 mm, the dimension "c"=0.5 mm, the diameter Φd=4 mm, and the diameter Φe=6 mm. In the hole having the same level as the fitting portion and the reflecting surfaces, the deformation amount of the reflecting surfaces when the radial stress is generated in the direction of expanding the hole by 40 μm is shown.

In the related art, the deformation amount is 100%, whereas in the first embodiment, the deformation amount is 60%. The deformation amount when the stress is applied to the fitting portion 311 of the first embodiment is reduced by about 40% relative to the related art. What actually causes the image deterioration is a difference in the deformation amount between the reflecting surfaces 313, that is, a difference between the surfaces. When the deformation amount becomes small, the difference between the surfaces becomes small, and image deterioration can be suppressed.

In the first embodiment, the case where the protrusion 312 extending in one direction of the rotational axis is provided has been described, but it is also possible to provide the protrusions 312 on the both sides in the rotational axis direction and to provide the fitting portion 311 only on one side. By providing the protrusions 312 on both sides in the rotational axis direction, it is possible to suppress the reflecting surfaces 313 from being tilted due to the centrifugal force when the rotary polygon mirror 1131 is rotated.

Thus, in the first embodiment, the center of rotation of the rotary polygon mirror 1131 is positioned by the flange portion 223. The hole 31 of the rotary polygon mirror 1131 has a portion larger than the diameter of the flange portion 223 and the fitting portion 311 which is a portion to be fitted to the flange portion 223. The rotary polygon mirror 1131 has the protrusion 312 which is a portion extending along the periphery (the inner surface 31a) of the hole 31 and extending in at least one of the rotational axis directions from a portion on which the reflecting surfaces 313 of the rotary polygon mirror 1131 are projected in the direction perpendicular to the rotational axis direction. At least a part of the portion larger than the diameter of the flange portion 223 is included in the portion on which the reflecting surfaces 313 of the rotary polygon mirror 1131 are projected in the direction perpendicular to the rotational axis direction. At least a part of a fitting portion of the hole 31 is included in either one extended portion or both extended portions.

As described above, the static surface deformation of the reflecting surfaces 313 due to the fitting of the rotary polygon mirror 1131 can be suppressed without impairing the quietness of the light deflector 113. As described above, according to the first embodiment, the static surface deformation of the reflecting surfaces 313 of the rotary polygon mirror 1131 can be reduced without impairing the quietness of the light deflector 113.

Second Embodiment

[Rotary Polygon Mirror]

Figure 5:
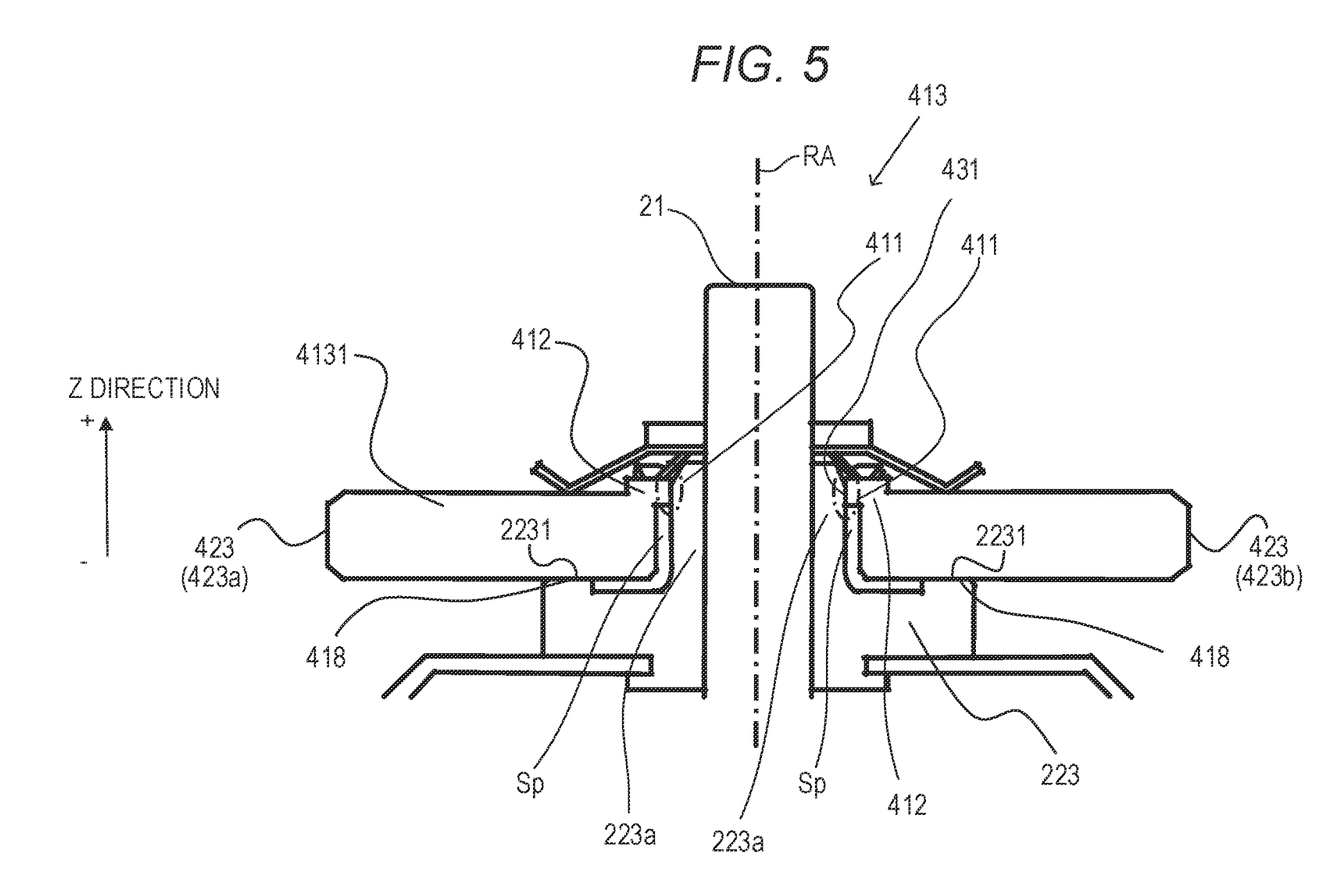
FIG. 5 is a schematic cross-sectional view showing a method of securing and positioning a rotary polygon mirror to a light deflector of the second embodiment.

FIG. 5 shows a configuration of a light deflector 413 of the second embodiment. A rotary polygon mirror 4131 of the second embodiment has a plurality of reflecting surfaces 423 (423a, 423b). As shown in FIG. 5, the rotary polygon mirror 4131 of the second embodiment has a protrusion 412 and a fitting portion 411 disposed on the + (plus) side in the Z direction. The protrusion 412 is provided on a surface opposite to the circuit board 23 out of two surfaces orthogonal to the rotational axis RA of the rotary polygon mirror 4131. The fitting portion 411 is fitted to the insertion portion 223a of the flange portion 223. The insertion portion 223a is protruded from the surface opposite to the circuit board 23 out of the two surfaces orthogonal to the rotational axis RA of the rotary polygon mirror 4131. Other configurations are the same as those of the first embodiment, and description thereof will be omitted.

Figure 6A:
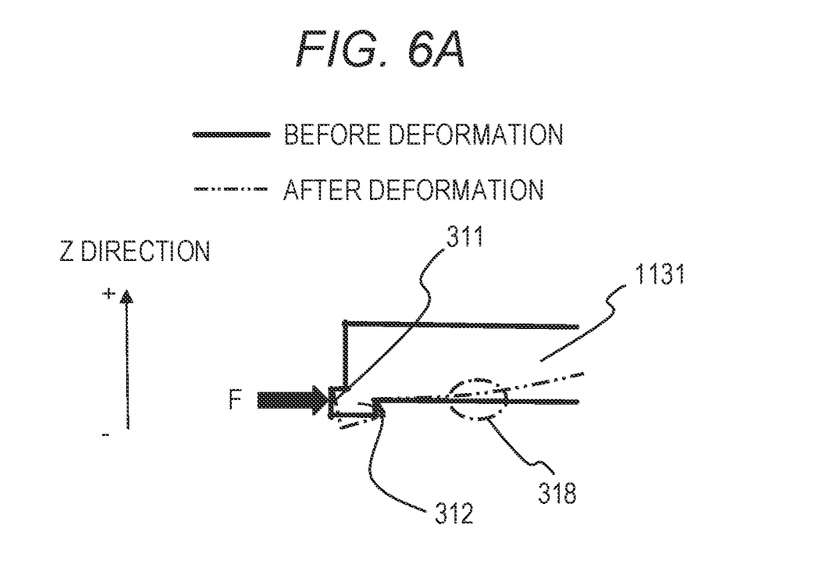
FIG. 6A is a conceptual view showing a deformation of a fitting portion and a protrusion provided on a lower surface of the rotary polygon mirror.
Figure 6B:
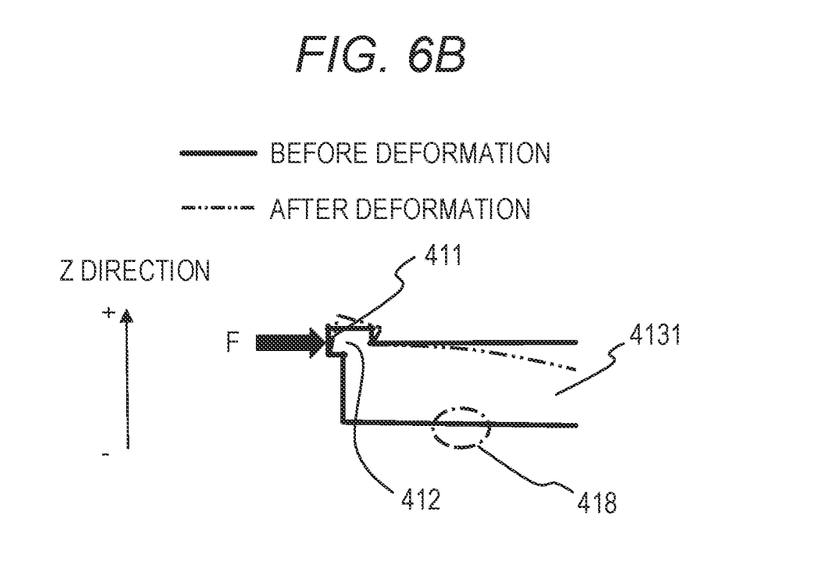
FIG. 6B is a conceptual view showing a deformation of a fitting portion and a protrusion of the rotary polygon mirror of the second embodiment.

The positioning of the rotary polygon mirror 4131 in the Z direction is performed by the support portion 2231 provided on the flange portion 223. Surface accuracy of several μm or less is required for a seat surface 418 of the rotary polygon mirror 4131 in contact with the support portion 2231. FIG. 6A is a view showing the fitting portion 311 and the protrusion 312 provided on the lower surface of the rotary polygon mirror 1131 of the first embodiment. The position of the seat surface 318 of the rotary polygon mirror 1131 is indicated by a circle of a dot and dash line. FIG. 6B is a view showing the fitting portion 411 and the protrusion 412 provided on the upper surface of the rotary polygon mirror 4131 of the second embodiment. The position of the seat surface 418 of the rotary polygon mirror 4131 is indicated by a circle of a dot and dash line. In FIGS. 6A and 6B, a shape before deformation is indicated by a solid line, and a shape after deformation is indicated by a two-dot chain line. As shown in FIGS. 6A and 6B, when the stress F acts on the fitting portions 311 and 411, the protrusions 312 and 412 and their peripheries of the rotary polygon mirrors 1131 and 4131 are locally greatly deformed.

With respect to the deformation, there is a possibility that a difference in the deformation amount in a spatial distribution occurs due to a difference in roundness and eccentricity between the fitting portions 311 and 411 and the flange portion 223. When the protrusion 312 and the seat surface 318 are close to each other as shown in FIG. 6A, the deformation amount of the seat surface 318 in the Z direction causes a spatial distribution, that is, a difference in the radial direction of a virtual circle around the rotational axis RA. As a result, a difference between inclination amounts of the reflecting surfaces 313 of the rotary polygon mirror 1131 may occur so that there is a possibility of a difference in the spatial distribution. Since there is a difference between the inclination amounts of the reflecting surfaces 313, the laser light L in FIG. 1B may shift in the sub-scanning direction (V direction), leading to image deterioration.

As shown in FIG. 6B, when the protrusion 412 and the seat surface 418 are separated from each other, the deformation amount of the seat surface 418 in the Z direction is suppressed to be small. Therefore, the inclination amounts of the reflecting surfaces 423 are reduced, and thus the difference between the reflecting surfaces 423a and 423b can be suppressed to be small. Therefore, in the second embodiment, as shown in FIG. 6B, the protrusion 412 having the fitting portion 411 is extended in the direction opposite to the seat surface 418, thereby suppressing the inclination of the reflecting surfaces 423. As described above, the fitting portion 411 is extended in the direction opposite to the support portion 2231 with respect to the rotational axis direction from a portion on which the reflecting surfaces 423 of the rotary polygon mirror 4131 are projected in the direction perpendicular to the rotational axis direction.

According to the structure described in the second embodiment, the static surface deformation and inclination of the reflecting surfaces 423 due to the fitting of the rotary polygon mirror 4131 to the flange portion 223 can be suppressed without impairing the quietness of the light deflector 413. Thus, according to the second embodiment, it is possible to reduce the static surface deformation of the reflecting surfaces 423 of the rotary polygon mirror 4131 without impairing the quietness of the light deflector 413.

Third Embodiment

[Rotary Polygon Mirror]

Figure 7:
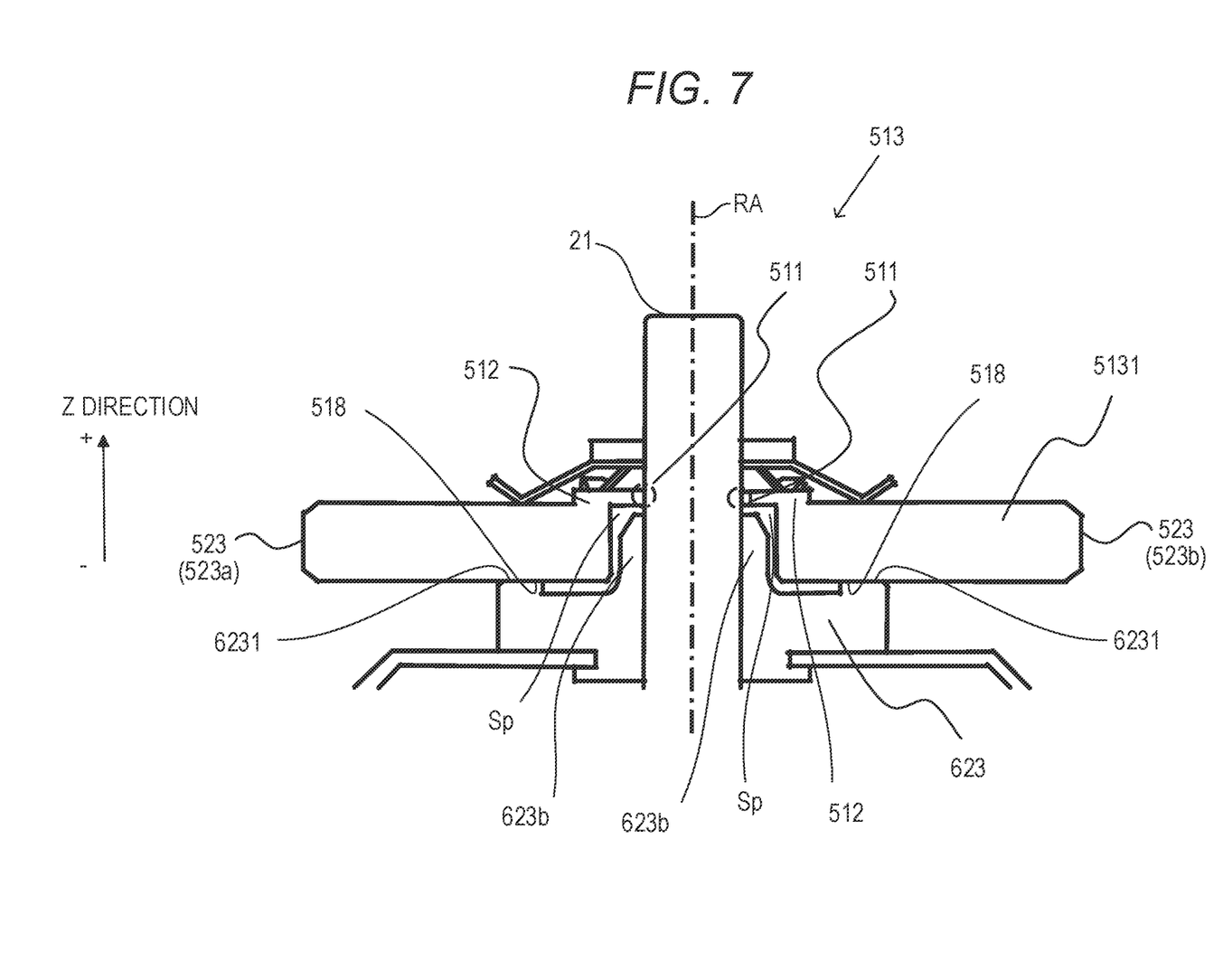
FIG. 7 is a schematic cross-sectional view showing a method of securing and positioning a rotary polygon mirror to a light deflector of the third embodiment.

FIG. 7 shows a configuration of a light deflector 513 of the third embodiment. The rotary polygon mirror 5131 of the third embodiment has a plurality of reflecting surfaces 523 (523a, 523b). The rotary polygon mirror 5131 of the third embodiment is supported in the Z direction by a support portion 6231 of a flange portion 623. A fitting portion 511 is fitted to the shaft 21. A protrusion 512 is provided on a surface opposite to the circuit board 23 out of two surfaces orthogonal to the rotational axis direction of the rotary polygon mirror 5131. An insertion portion 623a of the flange portion 623 is provided on the circuit board 23 side from the fitting portion 511 in the rotational axis direction. Other configurations are the same as those of the second embodiment, and description thereof will be omitted.

In the configuration described above, the shaft 21 and the flange portion 623 are fixed by the shrinkage fitting. A portion fixed by the shrinkage fitting (hereinafter referred to as a shrinkage fitting portion) is the insertion portion 623b. It is necessary to sufficiently secure the length in the Z direction of the shrinkage fitting portion between the shaft 21 and the flange portion 623 in order to secure the degree of perpendicularity between the rotational axis RA of the shaft 21 and the support portion 6231 and the holding force of both components. Therefore, the shrinkage fitting portion extends to the position of the rotary polygon mirror 5131 in the Z direction to form the insertion portion 623b. In the light deflector 913 of the related art shown in FIG. 8, the rotary polygon mirror 931 is fitted to the flange portion 921 to position the rotary polygon mirror 931 in the direction perpendicular to the rotational axis direction.

When the fitting portion 511 is provided on the protrusion 512 provided on the + (plus) side in the Z direction as in the third embodiment, the fitting portion 511 is disposed at a position on the + (plus) side in the Z direction from the shrinkage fitting portion (the insertion portion 623b). Therefore, the rotary polygon mirror 5131 and the shaft 21 can be directly fitted and positioned to each other without the flange portion 623. When the rotary polygon mirror 5131 is fitted to the shaft 21, the coaxiality between the rotational axis RA of the rotor portion (rotor magnet 222 or the like) and the fitting portion 511 is improved as compared with the case in which the rotary polygon mirror 5131 is fitted to the flange portion 623. Further, since the fitting portion 511 is protruded to the shaft 21, a diameter (an inner diameter) of the fitting portion 511 is smaller than when the fitting portion is fitted to the flange portion 623. When radial stress is generated in the fitting portion 511 due to temperature change, the smaller the diameter of the fitting portion 511, the smaller the area to which the stress is applied. As a result, a load applied to the rotary polygon mirror 5131 becomes small so that the deformation of the reflecting surfaces 523 becomes small.

Furthermore, in the case in which the fitting portion 411 is provided on the + side surface in the Z direction and is fitted to the flange portion 223 as in the embodiment 2 shown in FIG. 5, a length of the flange portion 223 (the insertion portion 223a) in the Z direction must be at least longer than a distance between the support portion 2231 and the fitting portion 411 in the Z direction. For example, in FIG. 5, the flange portion 223 (the insertion portion 223a) is extended through the hole 431 of the rotary polygon mirror 4131 so as to be exposed from the upper surface of the rotary polygon mirror 4131. In the configuration, the size of the flange portion 223 is increased so that the material cost is increased. The flange portion 223 is constituted by cutting a metal with high accuracy. The longer the flange portion 223, the longer the time required for cutting and the higher the cost. Therefore, by fitting the fitting portion 511 to the shaft 21 as in the third embodiment shown in FIG. 7, the flange portion 623 (the insertion portion 623b) can be formed to be short in the Z direction, so that the component cost and the time required for cutting can be reduced.

According to the structure described in the third embodiment, the static surface deformation of the reflecting surfaces 523 due to the fitting of the rotary polygon mirror 5131 to the shaft 21 can be suppressed, the coaxiality between the rotary polygon mirror 5131 and the rotor portion can be improved, and the component cost can be suppressed. Thus, according to the third embodiment, it is possible to reduce the static surface deformation of the reflecting surfaces 523 of the rotary polygon mirror 5131 without impairing the quietness of the light deflector 513.

In the first embodiment, the fitting portion 311 of the protrusion 312 has a continuous shape in the circumferential direction as shown in FIG. 2B. Similarly, the fitting portion 411 of the protrusion 412 of the second embodiment and the fitting portion 511 of the protrusion 512 of the third embodiment have a continuous shape in the circumferential direction. However, the present disclosure is not limited thereto. For example, the fitting portions 311, 411, and 511 may be discontinuous in the circumferential direction.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-185008, filed Nov. 5, 2020, which is hereby incorporated by reference herein in its entirety.

What is claimed is:

1. A light deflector comprising:
   a rotary polygon mirror including a plurality of reflecting surfaces configured to reflect light emitted from a light source and a hole portion provided at a center of rotation along a rotational axis direction of the rotary polygon mirror; and
   a motor configured to rotate the rotary polygon mirror,
   wherein the motor includes a shaft portion inserted into the hole portion and a support member configured to support the rotary polygon mirror in the rotational axis direction,
   wherein the support member is fixed to the shaft portion, is coaxial with the shaft portion, and includes an insertion portion inserted into the hole portion with the shaft portion,
   wherein the rotary polygon mirror further includes a protruded portion in a vicinity of the hole portion,
   wherein, with respect to the rotational axis direction, the protruded portion of the rotary polygon mirror is protruded from at least one surface of the rotary polygon mirror orthogonal to the rotational axis direction, wherein the protruded portion includes a fitting portion in which a portion continued from a surface forming the hole portion is protruded toward the center of the rotation more than the surface forming the hole portion, and is fitted to the shaft portion or the support member, and wherein, with respect to the rotational axis direction, the fitting portion is provided in an area outside an area where the plurality of reflecting surfaces are provided.

2. The light deflector according to claim 1, wherein an inner diameter of the hole portion in the fitting portion is smaller than an inner diameter of the hole portion in a portion other than the fitting portion.

3. The light deflector according to claim 1, wherein a protrusion amount of the protruded portion in the rotational axis direction is smaller than a thickness of the rotary polygon mirror.

4. The light deflector according to claim 1, further comprising a board on which the motor is mounted,
wherein the protruded portion is provided on a surface on a side of the board of two surfaces of the rotary polygon mirror orthogonal to the rotational axis direction, and
wherein the fitting portion is fitted to the insertion portion of the support member.

5. The light deflector according to claim 4,
wherein the support member includes a support portion configured to support the surface on the side of the board of the two surfaces of the rotary polygon mirror orthogonal to the rotational axis direction, and
wherein a space is formed between the protruded portion and the support member.

6. The light deflector according to claim 5, wherein the insertion portion of the support member is protruded from an opposed surface.

7. The light deflector according to claim 1, further comprising a board on which the motor is mounted,
wherein the protruded portion is provided on an opposed surface to the board that opposes two surfaces of the rotary polygon mirror orthogonal to the rotational axis direction, and
wherein the fitting portion is fitted to the insertion portion of the support member.

8. The light deflector according to claim 1, further comprising a board on which the motor is mounted,
wherein the protruded portion is provided on an opposed surface to the board that opposes two surfaces of the rotary polygon mirror orthogonal to the rotational axis direction, and
wherein the fitting portion is fitted to the shaft portion.

9. The light deflector according to claim 8, wherein the insertion portion of the support member is provided on a side of the board from the fitting portion in the rotational axis direction.

10. The light deflector according to claim 1, wherein the rotary polygon mirror is formed of resin, and the support member is formed of metal.

11. A light scanning apparatus comparing:
a light source; and
a light deflector, wherein the light deflector includes:
a rotary polygon mirror including a plurality of reflecting surfaces configured to reflect light emitted from the light source and a hole portion provided at a center of rotation along a rotational axis direction of the rotary polygon mirror, and
a motor configured to rotate the rotary polygon mirror,
wherein the motor includes a shaft portion inserted into the hole portion and a support member configured to support the rotary polygon mirror in the rotational axis direction,
wherein the support member is fixed to the shaft portion, is coaxial with the shaft portion, and includes an insertion portion inserted into the hole portion with the shaft portion,
wherein the rotary polygon mirror further includes a protruded portion in a vicinity of the hole portion,
wherein, with respect to the rotational axis direction, the protruded portion of the rotary polygon mirror is protruded from at least one surface of the rotary polygon mirror orthogonal to the rotational axis direction,
wherein the protruded portion includes a fitting portion in which a portion continued from a surface forming the hole portion is protruded toward the center of the rotation more than the surface forming the hole portion, and is fitted to the shaft portion or the support member, and
wherein, with respect to the rotational axis direction, the fitting portion is provided in an area outside an area where the plurality of reflecting surfaces are provided.

12. An image forming apparatus comprising:
an image bearing member;
a light scanning apparatus configured to form an electrostatic latent image on the image bearing member,
wherein the light scanning apparatus includes a light source, and a light deflector,
wherein the light deflector includes:
a rotary polygon mirror including a plurality of reflecting surfaces configured to reflect light emitted from the light source and a hole portion provided at a center of rotation along a rotational axis direction of the rotary polygon mirror, and
a motor configured to rotate the rotary polygon mirror,
wherein the motor includes a shaft portion inserted into the hole portion and a support member configured to support the rotary polygon mirror in the rotational axis direction,
wherein the support member is fixed to the shaft portion, is coaxial with the shaft portion, and includes an insertion portion inserted into the hole portion with the shaft portion,
wherein the rotary polygon mirror further includes a protruded portion in a vicinity of the hole portion,
wherein, with respect to the rotational axis direction, the protruded portion of the rotary polygon mirror is protruded from at least one surface of the rotary polygon mirror orthogonal to the rotational axis direction,
wherein the protruded portion includes a fitting portion in which a portion continued from a surface forming the hole portion is protruded toward the center of the rotation more than the surface forming the hole portion, and is fitted to the shaft portion or the support member, and
wherein, with respect to the rotational axis direction, the fitting portion is provided in an area outside an area where the plurality of reflecting surfaces are provided;
a developing unit configured to develop the electrostatic latent image formed by the light scanning apparatus with toner to form a toner image;
a transfer unit configured to transfer the toner image formed by the developing unit to a sheet; and
a fixing unit configured to fix an unfixed toner image transferred by the transfer unit.

13. A rotary polygon mirror for reflecting light, the rotary polygon mirror comprising:
   a plurality of reflecting surfaces configured to reflect light emitted from a light source and a hole portion provided at a center of rotation along a rotational axis direction of the rotary polygon mirror; and
   a protruded portion in a vicinity of the hole portion,
   wherein, with respect to the rotational axis direction, the protruded portion of the rotary polygon mirror is protruded from at least one surface of the rotary polygon mirror orthogonal to the rotational axis direction,
   wherein the protruded portion includes a fitting portion in which a portion continued from a surface forming the hole portion is protruded toward the center of the rotation more than the surface forming the hole portion, and is fitted to a shaft portion of a motor driving the rotational polygon mirror or a support member supporting the rotational polygon mirror, and
   wherein, with respect to the rotational axis direction, the fitting portion is provided in an area outside an area where the plurality of reflecting surfaces are provided.

14. The rotary polygon mirror according to claim 13, wherein an inner diameter of the hole portion in the fitting portion is smaller than an inner diameter of the hole portion in a portion other than the fitting portion.

15. The rotary polygon mirror according to claim 13, wherein a protrusion amount of the protruded portion in the rotational axis direction is smaller than a thickness of the rotary polygon mirror.

* * * * *